US011054251B2

(12) United States Patent
McWithey et al.

(10) Patent No.: US 11,054,251 B2
(45) Date of Patent: Jul. 6, 2021

(54) SYSTEMS AND METHODS TO DETERMINE WORKPIECE CHARACTERISTICS

(71) Applicant: Illinois Tool Works Inc., Glenview, IL (US)

(72) Inventors: Kevin McWithey, Oshkosh, WI (US); Paul Verhagen, Appleton, WI (US)

(73) Assignee: Illinois Tool Works Inc., Glenview, IL (US)

(*) Notice: Subject to any disclaimer, the term of this patent is extended or adjusted under 35 U.S.C. 154(b) by 170 days.

(21) Appl. No.: 15/420,782

(22) Filed: Jan. 31, 2017

(65) Prior Publication Data
US 2018/0217074 A1 Aug. 2, 2018

(51) Int. Cl.
| G01B 21/02 | (2006.01) |
| B23K 31/12 | (2006.01) |
| B23K 9/235 | (2006.01) |
| B23K 9/028 | (2006.01) |
| G01N 25/18 | (2006.01) |
| B23K 9/16 | (2006.01) |
| B23K 101/06 | (2006.01) |

(52) U.S. Cl.
CPC .......... *G01B 21/02* (2013.01); *B23K 9/028* (2013.01); *B23K 9/16* (2013.01); *B23K 9/235* (2013.01); *B23K 31/12* (2013.01); *G01N 25/18* (2013.01); *B23K 2101/06* (2018.08)

(58) Field of Classification Search
CPC .................................. H05B 6/101; H05B 6/06
USPC .................... 374/1, 141, 100, 137, 110, 166
See application file for complete search history.

(56) References Cited

U.S. PATENT DOCUMENTS

| 3,756,870 A * | 9/1973 | Kasper et al. | C21D 1/10 |
| | | | 148/572 |
| 5,179,265 A * | 1/1993 | Sheridan | A21B 1/245 |
| | | | 219/388 |
| 5,715,361 A * | 2/1998 | Moslehi | C23C 16/482 |
| | | | 118/725 |
| 6,265,701 B1 | 7/2001 | Bickel et al. | |
| 7,015,439 B1 * | 3/2006 | Thomas | H05B 6/06 |
| | | | 219/663 |
| 2006/0289495 A1 * | 12/2006 | Thomas | H05B 6/06 |
| | | | 219/677 |

(Continued)

OTHER PUBLICATIONS

Miller, ProHeat 35 Air-Cooled Induction System, Product Sheet, Issued Mar. 2016—Index No. IN/14.0, 4 pages.

*Primary Examiner* — Lisa M Caputo
*Assistant Examiner* — Janice M Soto
(74) *Attorney, Agent, or Firm* — McAndrews, Held & Malloy, Ltd.

(57) ABSTRACT

A heating system includes a power source connected to a heater to heat a workpiece via the heater and a controller. The controller is configured to receive the first temperature measurement signal, the first temperature measurement signal corresponding to a first temperature of the workpiece. The controller is to turn on the power source to activate the heater to heat the workpiece, receive the second temperature measurement signal in response to heating the workpiece, the second temperature measurement signal corresponding to a second temperature of the workpiece. The controller calculates a change in temperature of the workpiece based on the first and second temperatures, and determines a physical characteristic of the workpiece based on the change in temperature.

18 Claims, 3 Drawing Sheets

(56) References Cited

U.S. PATENT DOCUMENTS

| | | | | |
|---|---|---|---|---|
| 2011/0272393 | A1* | 11/2011 | Donarski | F24C 15/106 |
| | | | | 219/443.1 |
| 2011/0284524 | A1* | 11/2011 | Okuda | H05B 6/062 |
| | | | | 219/622 |
| 2011/0284527 | A1* | 11/2011 | Holverson | B23K 9/235 |
| | | | | 219/660 |
| 2014/0299595 | A1* | 10/2014 | Sherrill | F16L 53/34 |
| | | | | 219/676 |
| 2015/0334780 | A1* | 11/2015 | Beistle | H05B 6/06 |
| | | | | 219/667 |
| 2015/0334781 | A1* | 11/2015 | Verhagen | H05B 6/101 |
| | | | | 219/667 |
| 2015/0334782 | A1* | 11/2015 | Garvey | G01P 15/02 |
| | | | | 219/663 |
| 2018/0073933 | A1* | 3/2018 | Keskin | G01K 1/026 |

* cited by examiner

SYSTEMS AND METHODS TO DETERMINE WORKPIECE CHARACTERISTICS

BACKGROUND

Welding is a process that has become ubiquitous in various industries and applications, such as construction, ship building, etc., to weld large, thick pieces of steel (or other material) together. When welding thick workpieces (e.g., steel or other material) it is generally desirable to pre-heat the workpiece along the weld path. Pre-heating raises the temperature of the workpiece along the weld path to ensure filler metals more completely bind to the workpiece, for example, when a high-alloy steel is being welded. Without pre-heating there is a greater likelihood that the filler metal will not properly bind with the workpiece, and a defect may result.

SUMMARY

Methods and systems are provided for automatic detection of a characteristic of a workpiece (e.g., the size of the workpiece), substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
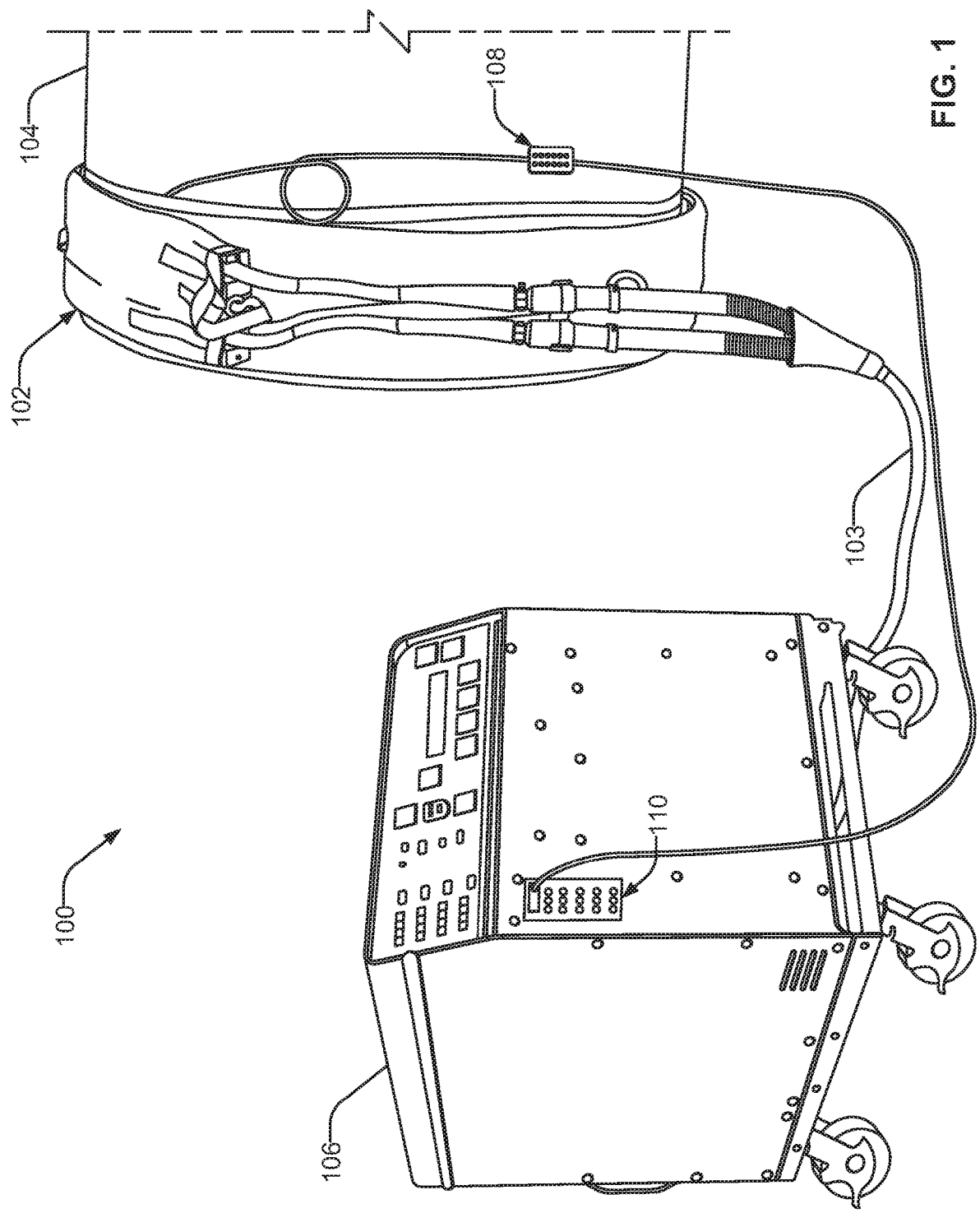
FIG. 1 illustrates an example implementation of a system to determine a characteristic of a workpiece, in accordance with aspects of this disclosure.

Often two workpieces having different properties (e.g., thicknesses, diameter, etc.) are to be welded. Thus, applying the same amount of power to heat each workpiece may compromise the integrity of one workpiece (e.g., a smaller, thinner workpiece) in comparison to another (e.g., a larger, thicker workpiece). Accordingly, a system for detecting a characteristic (e.g., thermal mass, size, etc.) of a workpiece, and applying power to appropriately heat a workpiece of the detected size, is desirable.

Methods and systems are disclosed for determining a characteristic of a workpiece based on a change in temperature, in a welding-type environment. For example, a system can determine the amount of power needed to heat the workpieces to a pre-weld temperature prior to welding based on the characteristic, without compromising the integrity of the workpiece.

Disclosed example systems determine the characteristic (e.g., a physical characteristic such as thermal mass, size, etc.) by activating one or more heaters, such as induction heating systems, resistive heating systems, or other suitable heaters. The temperature of the workpiece is measured by one or more temperature sensors (e.g., a thermistor, infrared (IR) sensor, etc.) at or near the workpiece being heated by the heater. In an example, the system calculates a change in temperature detected at the one or more sensors in response to activation of the heater, for instance a pre-activation temperature compared to a post-activation temperature. Based on the change in temperature, the thermal mass of the workpiece can be determined.

Additionally or alternatively, other variables can enhance the accuracy of the determination. For example, the amount of energy supplied to the heater, the type and size of heater being used, information related to properties of the workpiece, etc., can be used to determine the thermal mass of the workpiece based on the change in temperature. Thermal mass represents a measure of a material's ability to absorb and store heat energy, similar to thermal conductivity. In high density materials (e.g., metals, concrete, etc.), a large amount of heat energy is required to change the temperature of the material. Thus, high density materials have high a thermal mass and lightweight materials have a low thermal mass.

The system can also include a memory device that includes a list of values that associates temperature change values with corresponding characteristics of the workpiece. By referencing the list of values, the controller can identify a temperature change value corresponding to the calculated change in temperature. By this comparison, the controller is able to identify the characteristic (e.g., the thermal mass and/or size of the workpiece) by looking up the corresponding change in temperature listed in the memory device.

Output power to the heater (e.g., induction coil) is therefore controlled in response to the determined workpiece characteristic. Typically, more power is needed for a large and/or massive workpiece. A controller can adjust power automatically in response to direct and/or indirect temperature measurements (e.g., making direct contact by a thermocouple, using IR sensors, etc.).

Disclosed examples employ a heating system to detect a characteristic of a workpiece. For example, a heater heats the workpiece with power from a power source connected to the heater. The controller is configured to receive a first temperature measurement signal (e.g., from a temperature sensor), the first temperature measurement signal corresponding to a first temperature of the workpiece. The controller turns on the power source to activate the heater to heat the workpiece, and receives a second temperature measurement signal in response to heating the workpiece, the second temperature measurement signal corresponding to a second temperature of the workpiece. The controller calculates a change in temperature of the workpiece based on the first and second temperatures, and determines a thermal mass of the workpiece based on the change in temperature.

In some examples, turning on the heater includes controlling the power supply to activate the heater such that a full amount of power is provided to the heater. In other examples, the thermal mass comprises a thermal mass of the workpiece.

In some examples, the controller is configured to access a memory device that includes a list of values that associates temperature change values with corresponding thermal mass of the workpiece. The controller is further configured to identify a temperature change value corresponding to the calculated change in temperature, and identify the thermal mass by looking up the change in temperature in the memory device. In other examples, the controller is configured to interpolate the temperature change value based on a plurality of temperature change values associated with a corresponding thermal mass stored in the memory device, as well as select a corresponding thermal mass based on the interpolated temperature change value.

In some examples, the controller includes a network interface to access the memory device via a communications network. In other examples, the controller is configured to calculate the change in temperature of the workpiece based on the first temperature measurement signal and the second temperature measurement signal measured at a location of the workpiece corresponding to substantially a center of a heating profile of the workpiece.

In some examples, a temperature sensor is configured to measure the first and second temperature measurements, the temperature sensor including a thermocouple or a thermistor in thermal contact with the workpiece. In other examples, the temperature sensor comprises an infrared sensor to sense a temperature change of the workpiece. In some examples, the temperature sensor comprises two or more thermocouples or thermistors, the change in temperature of the workpiece is based on temperature measurements from the two or more thermocouples or thermistors. In some examples, the controller is further configured to receive corresponding measurements from different thermocouples or thermistors, and select the highest temperature for determining the thermal mass.

In some examples, the controller is configured to receive information from the temperature sensor via a wired connection. In some examples, the controller is configured to receive information from the temperature sensor via a wireless connection. In some examples, the power source transmits a waveform with a predetermined amount of energy to the heater to heat the workpiece.

Disclosed examples employ another method to determine a physical characteristic of a workpiece. The method includes receiving, at a controller of a welding-type power source, a first temperature measurement from a temperature sensor in thermal contact with the workpiece, the first temperature measurement signal corresponding to a first temperature of the workpiece. The method further includes turning on, by the controller, a power source to activate a heater to heat the workpiece, receiving, at the controller, a second temperature measurement from a temperature sensor in response to heating the workpiece, the second temperature measurement signal corresponding to a second temperature of the workpiece, and calculating, by the controller, a change in temperature of the workpiece based on the first and second temperature measurements. Further, a physical characteristic of the workpiece based on the change in temperature is determined by the controller.

Example methods further include accessing a memory device that includes a list of values that associates temperature change values with corresponding physical characteristics of the workpiece, identifying a temperature change value corresponding to the calculated change in temperature; and identifying the physical characteristic by looking up the change in temperature in the memory device.

The term "induction heating power supply," as used herein, refers to a power source that is capable of providing power to an induction coil to induce heat in a metallic workpiece. The term "induction coil," as used herein, refers to a conductor with current flowing therein, which heats a workpiece by induction. As provided herein, a welding-type power supply can be configured to generate induction heating power, as well as powering other tools (e.g., a welding-type torch). The welding-type power supply may include a controller to measure temperature(s) from the sensors, as well as activate the heater.

Welding-type power, as used herein, refers to power suitable for welding, plasma cutting, induction heating, air carbon-arc cutting and/or gouging (CAC-A), cladding, and/or hot wire welding/preheating (including laser welding and laser cladding), including inverters, converters, choppers, resonant power supplies, quasi-resonant power supplies, etc., as well as control circuitry and other ancillary circuitry associated therewith. In some example systems, a dedicated heating power supply (e.g., an induction heating power source) can additionally or alternatively be employed.

As described with reference to the several figures, the present disclosure provides systems and methods that determine a characteristic of a workpiece to be heated, and determines proper pre-heating of the workpiece based on the characteristic. Accordingly, the system is able to avoid overheating workpieces, as described in detail with respect to the figures.

FIG. 1 illustrates an example heating system 100 suitable for powering a welding-type heater and/or welding operations. The heating system 100 includes a welding-type power supply 106, a heater 102 (e.g., an induction heating blanket,) connected to the power supply 106 by a power cable 103, and a controller 110. Example implementations of the heater 102 include an induction heating blanket, one or more conductors configured to be magnetically coupled to a workpiece, and/or one or more resistive heating elements. One or more sensors 108 provide temperature measurements to the controller 110. For example, sensor 108 can be a thermistor or thermocouple in thermal contact with a workpiece 104. Additionally or alternatively, the sensor 108 can be an IR sensor viewing a heat signature of the workpiece 104. In some examples, the sensor 108 can be located at a geometric center of a heating profile created by activation of the heater 102. The sensor 108 can also be located proximate to the heater 102 at a distance sufficient to measure the effects of the heater 102 on the workpiece 104. In other examples, multiple sensors 108 are employed, each providing temperature measurements to the controller 110. In some examples, the sensor 108 is integrated with the heater 102. The sensor 108 can communicate with the controller 110 by a wired connection or through wireless data transfer.

In an example where multiple sensors 108 and/or multiple temperature measurements are provided to the controller 110, the change in temperature can reflect one or more of an average temperature change, the largest change in temperature (i.e., based on the highest collected temperature), or a temperature change value that has been weighted by one or more factors. For instance, a sensor 108 located at the center of a heating profile may be assigned a greater weight than a sensor 108 at the periphery. In some examples, the change in temperature over time, in the alternative or in addition to the change in temperature alone, may indicate a characteristic of the workpiece. For instance, a steep rise in temperature over time may indicate a smaller thermal mass and/or size of the workpiece 104, whereas a gradual rise may indicate a larger thermal mass and/or size of the workpiece 104.

Although described with respect to heating, the system 100 may also be coupled to other devices, such as a wire feeder, a welding torch, a plasma cutter, a power generator, or any combination thereof.

The example controller 110 of FIG. 1 controls some operations of the system 100 and may be integrated with the system 100. In other examples, the controller 110 is implemented in a cloud computing environment, on one or more physical machines, and/or on one or more virtual machines, and can be remotely accessed by the system via one or more communication methods. In some examples, the controller 110 can be a general-purpose computer, a laptop computer, a tablet computer, a mobile device, a server, and/or any other type of computing device.

Figure 2:
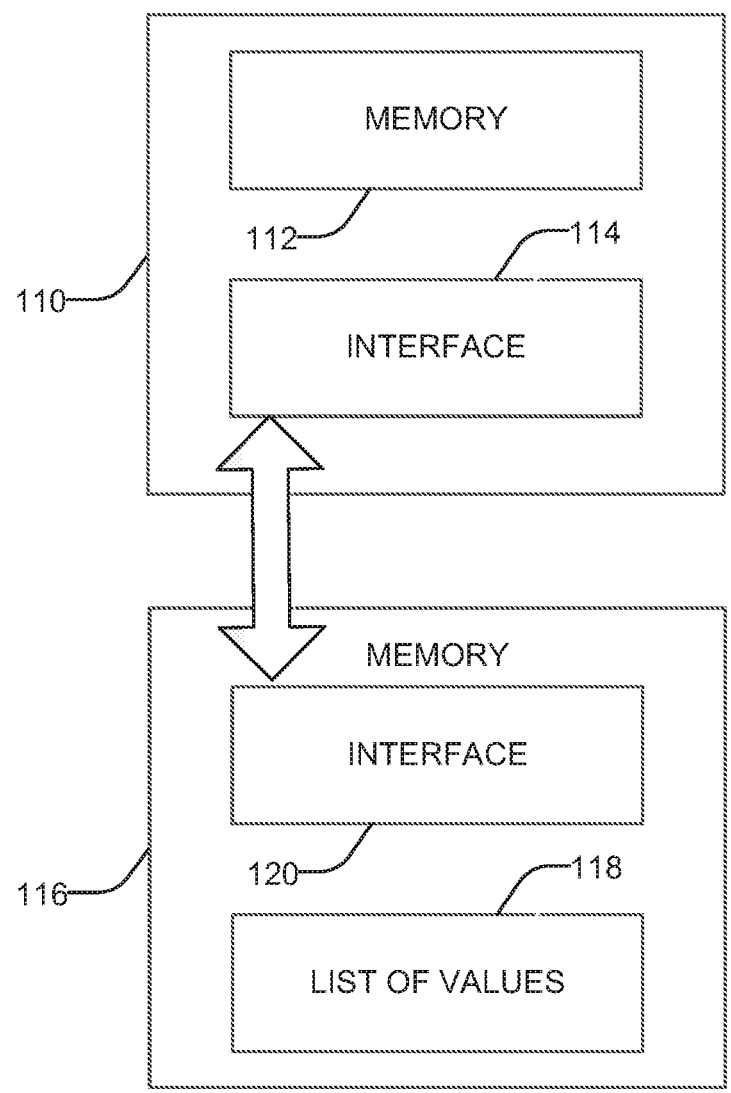
FIG. 2 is a block diagram of example features to determine a characteristic of a workpiece, in accordance with aspects of this disclosure.

As shown in FIG. 2, the controller 110 is in communication with one or more interfaces 114, for example, an operator interface, a network interface, etc., and a storage device 112. The storage device 112 may include volatile or non-volatile memory, such as ROM, RAM, magnetic storage memory, optical storage memory, or a combination thereof. In some examples, the interface 114 and the storage device 112 may be integrated with the controller 110, may be located remotely, or a combination of the two, and communicate with the controller 110 via wired and/or wireless channels. In addition, a variety of control parameters may be stored in the storage device 112 along with code (e.g., non-transitory machine readable instructions) configured to provide a specific output during operation.

The controller 110 may receive input from the one or more interfaces 114 through which the welding type system receives commands from, for example, an operator (e.g., a welder). In some examples, the operator may employ one or more interfaces 114 to implement the autodetection and heating processes described herein, as well as desired parameters of the input power (e.g., voltages, currents, etc.). The controller 110 may be configured to receive and process a plurality of inputs regarding the performance and demands of the system 100.

For example, the controller 110 is configured to access a storage device 116 storing a look up table 118 that includes a list of temperature change values and corresponding characteristic. The controller 110 is further configured to compare a change in temperature to the list of characteristic values and, based on the comparison, the controller 110 is configured to determine a characteristic that substantially matches the change in temperature. In response, the controller 110 is configured to set a target pre-heating profile (e.g., a minimum and a maximum power value) for the heater 104, and transmit the needed power from the power supply 106 to heat the workpiece 104.

In some examples, the values in the list 118 may not exactly match a calculated change in temperature. Thus, the controller 110 is configured to interpolate the temperature change value based on a plurality of temperature change values associated with a corresponding characteristic stored in the memory device 116 and select a corresponding characteristic based on the interpolated temperature change value. Furthermore, the storage device 116 can be integrated in the system 100, or can be remotely connected. Communication between the storage device 116 and the system 100 can be conducted by one or more interfaces 120, such as a wired or a wireless data connection.

Furthermore, the storage device 116 can be integrated in the system 100, or can be remotely connected. Communication between the storage device 116 and the system 100 can be conducted by one or more interfaces 120, such as a wired or a wireless data connection.

Physical characteristics, or physical properties, of the workpiece 104 that affect the heating profile of the workpiece 104 may include thickness (e.g., pipe schedule), density, composition, thermal conductivity, thermal resistivity, and/or diameter of the workpiece, for instance. The physical characteristics, as described herein, are physical properties of the workpiece 104, which may not be the temperature of the workpiece 104 itself, but a physical characteristic that may be impacted by heat (e.g., thermal mass). In some examples, the interface 114 may allow for an operator to input information of one or more properties of the workpiece 104, which the controller 110 will assign as a variable to aid in determining the characteristic (e.g., thermal mass) of the particular workpiece 104.

The controller 110 can activate the heater 102 by providing sufficient power. In an example, the controller 110 can be configured to generate a predetermined amount of power (e.g., that reflects a maximum power rating for one of the heater 102 and/or the power supply 112). The power can be provided over a predetermined period of time, for example, as a continuous current or short pulses. Once the heater 102 has been activated, the sensor 108 provides an updated temperature to the controller 110. Thus, the controller 110 calculates the change in temperature between pre-activation and post-activation of the heater 102.

Once the temperature change is calculated, the controller 110 executes a process employing one or more variables to determine a characteristic (e.g., a thermal mass) of the workpiece 104. For example, as shown in FIG. 2, the controller 110 compares the change in temperature against a list of values 118 stored in a memory 116. Thus, the controller 110 determines a characteristic of the workpiece 104 based on a relationship between the change in temperature and the list of values 118 stored in memory 116. The controller 110 can then adjust a characteristic of the system 100 (e.g., the level of power transmitted to the heater 102) to ensure proper heating of the workpiece 104 based on the temperature measurements. For example, if the determined characteristic is a thermal mass of the workpiece 104, a larger value will suggest a greater amount of power will be required to properly heat the workpiece 104.

In some examples, the controller 110 has additional data relating to other variables that can impact the heating of the workpiece (e.g., properties of the workpiece, ambient conditions, etc.). Such data can be provided to the controller 110 by automatic means (e.g., sensors), input from a user (e.g., via a user interface 114 in communication with the controller 110), via specialized reporting entities (e.g., weather forecasters), and/or other sources.

As an alternative to using the list of values 118, the controller 110 may determine the characteristic(s) of the workpiece 104 using one or more algorithms relating the characteristic(s) to temperatures and/or observable temperature profiles.

In some examples, after determining the characteristic(s) of the workpiece 104, the controller 110 may control the system 100 to perform one or more verification tests to confirm the determined characteristic(s). For example, the system 100 may apply a second amount of heat and determine whether the resulting temperature increase in the workpiece 104 matches the determined characteristic. If the temperature increase does not match the expected increase based on the determined characteristic(s), the controller 110 may resolve the discrepancy by requesting user input, performing further testing, and/or any other error handling method.

Figure 3:
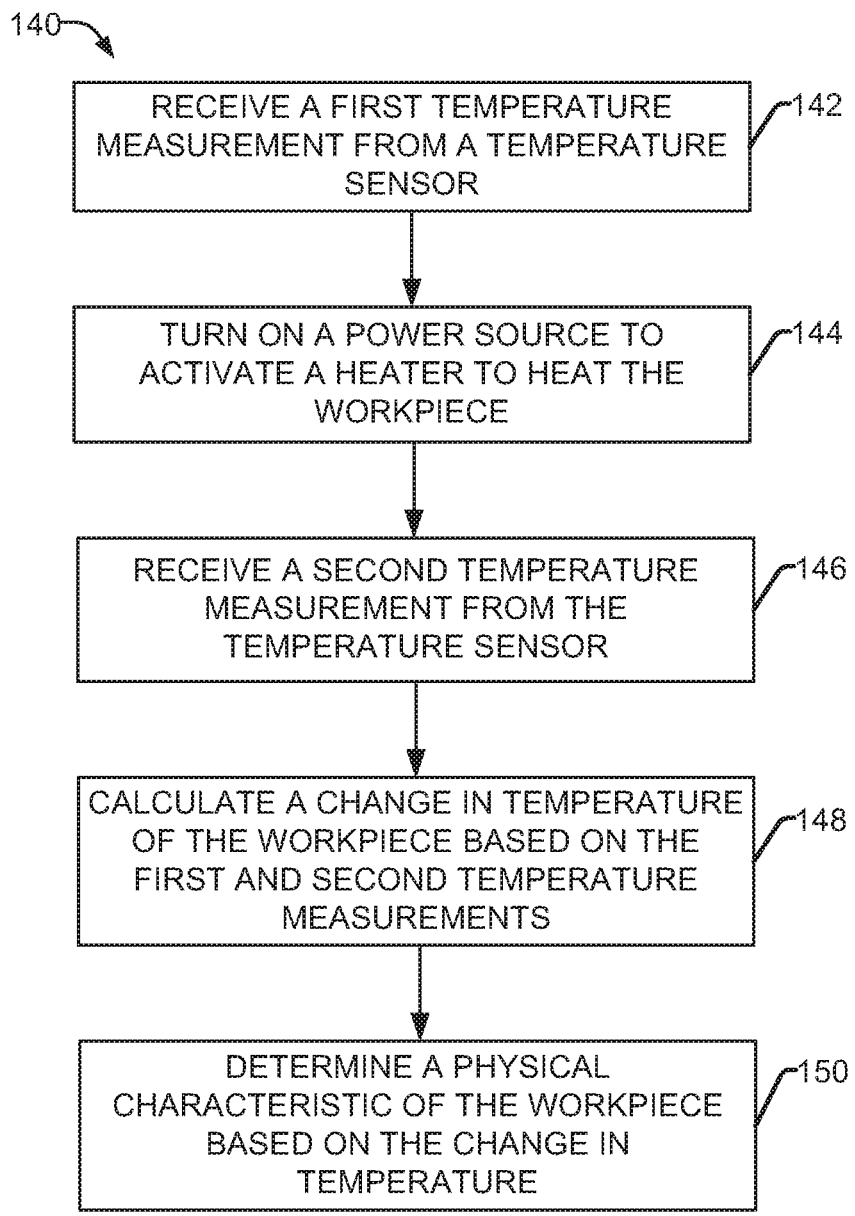
FIG. 3 is a flowchart illustrating an example method to determine a characteristic of a workpiece.

FIG. 3 is a flowchart illustrating an example method 140 to determine a characteristic of the workpiece (e.g., thermal mass of workpiece 104). In some examples, the method can be implemented as machine readable instructions which may be executed by a processor (e.g., controller 110 of FIG. 1), and may be stored on any suitable non-transitory machine readable media, such as storage device 112 described with respect to FIG. 2.

At block 142, a controller (e.g., controller 110) receives a first temperature measurement from a temperature sensor (e.g., sensor 108). At block 144, the controller turns on the power source to activate a heater (e.g., heater 102) to heat a workpiece (e.g., workpiece 104). For example, the controller can increase the power to maximize heating of the heater. At block 146, receives a second temperature measurement from the temperature sensor following activation of the heater. At block 148, the controller calculates a change in the temperature based on the first and second temperature measurements. At block 150, the controller determines a characteristic (e.g., a thermal mass) of the workpiece based on the change in temperature.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A non-transitory machine readable storage device comprising machine readable instructions which, when executed, cause a controller of an induction heating system to:

receive a first temperature measurement signal from a first temperature sensor located at a geometric center of a heating profile and a first temperature measurement signal from a second temperature sensor, the first temperature measurement signal of the first temperature sensor corresponding to a first temperature of a metallic workpiece at a first location at the geometric center of the heating profile, the first temperature measurement signal of the second temperature sensor corresponding to a first temperature of the metallic workpiece at a second location of the heating profile that is different than the first location at the geometric center;

turn on a power source to activate a heater to heat the metallic workpiece while the first or second temperature sensor maintains its location on the metallic workpiece following activation of the heater;

receive a second temperature measurement signal from the first temperature sensor and a second temperature signal from the second temperature sensor in response to heating the metallic workpiece, the second temperature measurement signal of the first temperature sensor corresponding to a second temperature of the metallic workpiece at the first location of the heating profile, the second temperature measurement signal of the second temperature sensor corresponding to a second temperature of the metallic workpiece at the second location of the heating profile;

assign a first weight to measurements from the first temperature sensor and a second weight less than the first weight to the second temperature sensor;

calculate a change in pre- and post-activation temperature of the metallic workpiece based on the first and second temperatures from the first and second temperature sensors in accordance with their respective weights;

determine a physical characteristic of the metallic workpiece based on the change in temperature;

set a target heating value corresponding to the physical characteristic; and adjust power transmitted to the heater to a level of power associated with the target heating value.

2. The non-transitory machine readable storage device as defined in claim 1, wherein the instructions, when executed, cause the controller to:

access a memory device that includes a list of values that associates temperature change values with corresponding physical characteristics of the metallic workpiece;

identify a temperature change value corresponding to the calculated change in temperature; and identify the physical characteristic by looking up the change in temperature in the memory device.

3. The non-transitory machine readable storage device as defined in claim 2, wherein the instructions, when executed, cause the controller to further identify the physical characteristic as a thermal mass of the metallic workpiece based on the change in temperature.

4. The non-transitory machine readable storage device as defined in claim 2, wherein the at least one temperature sensor comprises two or more thermocouples, the change in temperature of the metallic workpiece being based on temperature measurements from the two or more thermocouples.

5. A method to determine a physical characteristic of a metallic workpiece, comprising:
   receiving, at a controller of a power source, a first temperature measurement signal from a first temperature sensor in direct contact with the metallic workpiece, the first temperature measurement signal of the first temperature sensor corresponding to a first temperature of the metallic workpiece at a first location at a geometric center of a heating profile;
   receiving, at the controller, a first temperature measurement signal from a second temperature sensor in direct contact with the metallic workpiece, the first temperature measurement signal of the second temperature sensor corresponding to a first temperature of the metallic workpiece at a second location of the heating profile different than the first location at the geometric center;
   turning on, by the controller, a power source to activate a heater to heat the metallic workpiece;
   receiving, at the controller, a second temperature measurement signal from the first temperature sensor in response to heating the metallic workpiece, the second temperature measurement signal of the first temperature sensor corresponding to a second temperature of the metallic workpiece at the first location of the heating profile;
   receiving, at the controller, a second temperature measurement signal from the second temperature sensor in response to heating the metallic workpiece, the second temperature measurement signal of the second temperature sensor corresponding to a second temperature of the metallic workpiece at the second location of the heating profile;
   assigning, by the controller, a first weight to the first and second measurements from the first temperature sensor and a second weight less than the first weight to the first and second measurements from the second temperature sensor;
   calculating, by the controller, a change in temperature of the metallic workpiece based on the first and second temperature measurements from the first and second temperature sensors and the weights;
   determining, by the controller, a physical characteristic of the metallic workpiece based on the change in temperature;
   setting a target heating value corresponding to the physical characteristic; and
   adjusting power transmitted to the heater to a level of power associated with the target heating value.

6. The method to determine a physical characteristic of a metallic workpiece as defined in claim 5, further comprising:
   accessing a memory device that includes a list of values that associates temperature change values with corresponding physical characteristics of the metallic workpiece;
   identifying a temperature change value corresponding to the calculated change in temperature; and
   identifying the physical characteristic by looking up the change in temperature in the memory device.

7. The method to determine a physical characteristic of a metallic workpiece as defined in claim 5, wherein the heater comprises an induction heating blanket wrapped around the metallic workpiece.

8. A welding heating system, comprising:
   a power source configured to provide power to a welding heater to heat a metallic workpiece via the heater; and
   a controller configured to:
      receive a first temperature measurement signal from a first temperature sensor located at a geometric center of a heating profile and a first temperature measurement signal from a second temperature sensor, the first temperature measurement signal of the first temperature sensor corresponding to a first temperature of the metallic workpiece at a first location at the geometric center of the heating profile, the first temperature measurement signal of the second temperature sensor corresponding to a first temperature of the metallic workpiece at a second location of the heating profile that is different than the first location at the geometric center;
      turn on a power source to activate a heater to heat the metallic workpiece while the first and second temperature sensor maintains its location on the metallic workpiece following activation of the heater, wherein at least one of the first temperature sensor or the second temperature sensor comprises a thermocouple or a thermistor in thermal contact with the metallic workpiece;
      receive a second temperature measurement signal from the first temperature sensor and a second temperature signal from the second temperature sensor in response to heating the metallic workpiece, the second temperature measurement signal of the first temperature sensor corresponding to a second temperature of the metallic workpiece at the first location of the heating profile, the second temperature measurement signal of the second temperature sensor corresponding to a second temperature of the metallic workpiece at the second location of the heating profile;
      assign a first weight to measurements from the first temperature sensor and a second weight less than the first weight to the second temperature sensor;
      calculate a change in temperature of the metallic workpiece based on the first and second temperatures from the first and second temperature sensors in accordance with their respective weights;
      determine a physical characteristic of the metallic workpiece based on the change in temperature;
      set a target heating value corresponding to the physical characteristic; and
      adjust power transmitted to the heater to a level of power associated with the target heating value.

9. The welding heating system as defined in claim 8, the controller further configured to determine a size of the metallic workpiece based on the change in temperature.

10. The welding heating system as defined in claim 8, wherein the controller is configured to:
   access a memory device that includes a list of values that associates temperature change values with corresponding thermal mass of the metallic workpiece;
   identify a temperature change value corresponding to the calculated change in temperature; and
   identify the thermal mass by looking up the change in temperature in the memory device.

11. The welding heating system as defined in claim 10, wherein the controller is configured to:

interpolate the temperature change value based on a plurality of temperature change values associated with a corresponding thermal mass stored in the memory device; and select a corresponding thermal mass based on the interpolated temperature change value.

12. The welding heating system as defined in claim 10, wherein the controller comprises a network interface to access the memory device via a communications network.

13. The welding heating system as defined in claim 8, wherein at least one of the first temperature sensor or the second temperature sensor comprises an infrared sensor configured to sense a temperature change of the metallic workpiece.

14. The welding heating system as defined in claim 8, wherein the controller is configured to receive information from at least one of the first temperature sensor or the second temperature sensor via a wired connection.

15. The welding heating system as defined in claim 8, wherein the controller is configured to receive information from at least one of the first temperature sensor or the second temperature sensor via a wireless connection.

16. The welding heating system as defined in claim 8, wherein the power source transmits the power output as a waveform with a predetermined amount of energy to the heater to heat the metallic workpiece.

17. The welding heating system as defined in claim 8, the controller configured to control the power source to activate the heater such that an amount of power corresponding to a maximum power rating for one of the heater or the power supply is provided to the heater.

18. The welding heating system as defined in claim 8, wherein the heater comprises an induction heating blanket wrapped around the metallic workpiece.

* * * * *